United States Patent
Geissler

(10) Patent No.: US 10,960,459 B2
(45) Date of Patent: Mar. 30, 2021

(54) METHOD OF MANUFACTURING A DRUM OF AN AXIAL PISTON MACHINE

(71) Applicant: Liebherr Machines Bulle SA, Bulle (CH)

(72) Inventor: Lennard Geissler, Fürstenau (DE)

(73) Assignee: Liebherr Machines Bulle SA, Bulle (CH)

(*) Notice: Subject to any disclaimer, the term of this patent is extended or adjusted under 35 U.S.C. 154(b) by 45 days.

(21) Appl. No.: 16/207,766

(22) Filed: Dec. 3, 2018

(65) Prior Publication Data

US 2019/0176214 A1 Jun. 13, 2019

(30) Foreign Application Priority Data

Dec. 11, 2017 (CH) .................................. 1507/17

(51) Int. Cl.
*B21K 1/26* (2006.01)
*B21K 23/00* (2006.01)
*F03C 1/32* (2006.01)
*F04B 1/2035* (2020.01)
*B23P 15/00* (2006.01)
*F03C 1/06* (2006.01)
*F04B 1/2014* (2020.01)
*B21J 7/06* (2006.01)

(52) U.S. Cl.
CPC .............. *B21K 1/26* (2013.01); *B21K 23/00* (2013.01); *B23P 15/00* (2013.01); *F03C 1/0644* (2013.01); *F03C 1/0652* (2013.01); *F04B 1/2014* (2013.01); *F04B 1/2035* (2013.01); *B21J 7/06* (2013.01)

(58) Field of Classification Search
CPC .. B21K 1/26; B21K 23/00; B21K 1/24; F03C 1/0652; F03C 1/0644; F04B 1/2035; F04B 1/2014; B23P 15/00; B21J 7/06; F01B 3/0052
See application file for complete search history.

(56) References Cited

U.S. PATENT DOCUMENTS

| | | | | |
|---|---|---|---|---|
| 2,991,552 A | * | 7/1961 | Chatfield | B21J 5/02 72/340 |
| 5,129,797 A | * | 7/1992 | Kanamaru | F04B 1/2092 417/500 |
| 6,981,321 B1 | * | 1/2006 | Stoppek | F04B 1/2035 29/888.02 |

FOREIGN PATENT DOCUMENTS

GB 1169003 A * 10/1969 ............ F01B 3/0035

* cited by examiner

*Primary Examiner* — Ryan J. Walters
(74) *Attorney, Agent, or Firm* — Dilworth & Barrese, LLP

(57) ABSTRACT

The present invention relates to a method of manufacturing a drum of an axial piston machine by machining a cylindrical round metal, with the machining comprising a forging and with at least one structural element of the drum being produced or prefabricated by the forging.

13 Claims, 3 Drawing Sheets

METHOD OF MANUFACTURING A DRUM OF AN AXIAL PISTON MACHINE

BACKGROUND OF THE INVENTION

The invention relates to a method of manufacturing a drum of an axial piston machine.

Axial piston machines are known from the prior art. They can be used as pumps for converting mechanical energy into hydraulic energy or as motors for converting hydraulic energy into mechanical energy. Axial piston machines share a design, wherein a drum that can rotate about an axis of rotation and that has cylinder bores is encompassed between a control plate arranged at the hydraulic side and a sliding disk arranged at the mechanical side. The plane of the sliding disk is oblique to the axis of rotation of the drum and pistons are arranged in the cylinder bores of the drum that are in contact with the surface of the sliding disk by means of sliding blocks. The oppositely disposed end face of the drum at the hydraulic side is in direct contact with the control plate.

The typically axially symmetrical and substantially cylindrical drums of the axial piston machine are typically manufactured by cutting machining of perfectly cylindrical metal pieces. The cylinder bores and the center bore for the reception of the shaft are, for example, drilled into the metal cylinder and outer contours such as neck regions or depressions are milled in the region of the end faces. These methods, however, result in a comparatively high material loss and high wear at the machining tools, particularly since the drums are typically produced from steel.

SUMMARY OF THE INVENTION

It is the object of the invention to provide an improved method of manufacturing drums of the axial piston machines.

This object is satisfied in accordance with the invention by a method of manufacturing a drum of an axial piston machine by machining a cylindrical round metal, with the machining comprising a forging and with at least one structural element of the drum being produced or prefabricated by the forging. The forging inter alia has the advantage of small material loss. Higher strengths can furthermore be achieved for the forged structural elements by the change of the metal structure, which in particular produces a product improvement with mechanically heavily strained structural elements. The method can comprise a forging process for obtaining a structural element of the drum or a plurality of forging processes for obtaining different structural elements of the drum.

Provision is made in an embodiment that the machining comprises the manufacture of a preforged blank from the round metal, wherein the preforged blank is then further machined in a cutting manner. To obtain a preforged blank, one or more simultaneous forging processes can be carried out directly at the non-machined round metal or at a round metal premachined in a cutting manner. If a plurality of forging processes are provided for forming different structural elements, they can also be carried out sequentially. The blank that is further machined in a cutting manner can also be machined or fine machined again in later process stages as part of one or more forging processes, wherein a sequence of initial forging and subsequent cutting further machining can be preferred for reasons of the higher precision of cutting processes.

Provision is made in an embodiment that the forging is a drop forging process. The structural elements in this embodiment are forged using shaping tools, the dies, moved toward one another. The shape of the structural element to be produced is at least partly included as a negative in the die. This kind of forging has the advantage of high dimensional accuracy with respect to a free forging. To prevent a burr at the transition of the dies, it can be advantageous to provide the die division in a region of the preforged blank that is removed as part of the further machining, that is, a cutting process, for example, of the blank. A forging offset that can represent a mechanical weak point is thus also avoided in the region of the forged structural element.

Provision is made in an embodiment that the forging is a cold forging process or a semi-hot forging process, wherein the temperature of the round metal is preferably below 950° C. On cold forging or semi-hot forging, the working temperature is below the recrystallization range that starts at approximately 950° C. with steel. A higher material strength is achieved by structural change only below this temperature. The gain in strength is larger than with a semi-hot forming process than with cold forming at temperatures below 150° C., for example; however, higher forces are also required.

Provision is made in an embodiment that the structural element produced or prefabricated by forging is a neck region that projects from an end face of the drum in the axial direction and surrounds the region of the center bore. Such a neck region can in particular be provided at that end face of the drum that is disposed opposite the sliding disk in the axial piston machine. A shaping by forging can be particularly advantageous in the neck region since the toothed arrangement for connection to the shaft is frequently located at the inner neck and these drum sections can accordingly be subject to a particularly high torsional load in operation of the axial piston machine. In addition, a tilt force is active at this point that is caused by the pressing of the pistons toward the swash plate in high pressure operation. From a certain slanted position of the swash plate onward, a significant radial shear force is also added to this tilt force. Measured by this high load, the material thickness at this point is comparatively small since the center bore has to have a certain minimum diameter because the shaft is also exposed to a high torsional load and should therefore have a certain minimum diameter and since sufficient space has to be kept free for the accommodation of the pistons next to the neck region, which limits the maximum outer diameter of the neck region.

Provision is made in an embodiment that a structural element produced or prefabricated by forging is a section of the center bore. The center bore of the drum that serves for the accommodation of the shaft in operation can already be preforged in the region of one or both end faces or also continuously. A further treatment such as a connection of two preforged end regions, working in a toothed ring, or fine machining can take place in a cutting process.

Provision is made in an embodiment that a structural element produced or prefabricated by forging is a toothed ring at the center bore or at the jacket surface. An inner toothed arrangement at the center bore can, like the center bore, itself be prefabricated by forging and can optionally be fine machined in a cutting process. A high mechanical load capability is achieved by the forging. A toothed ring at the jacket surface can, for example, serve as a target of a speed sensor.

Provision is made in an embodiment that the structural element produced or prefabricated by forging is a depression at an end face of the drum and/or a marginal web surrounding such a depression. Such a depression or such a marginal web can in particular be provided at that end face of the drum that is disposed opposite the control plate in the axial piston machine and forms a corresponding functional surface. A depression can be formed to correspond to a concave contact surface of a control plate. To improve the sliding properties and the sealing, either the end face or the control plate can be provided with a corresponding coating, with the latter being able to be obtained by casting, plating, or build-up welding. The shape of the depression and, optionally, of the marginal web can be adapted to the intended kind of coating, with the marginal web, for example, being able to serve as a casting margin if a coating of the functional surface is intended by direct casting.

In the context of the die division, provision can be made that the die division is provided in the region of the marginal web surrounding the depression, with this marginal web being able to be removed after the casting of the depression. The die division is thus arranged in a region or in a structural element of the drum that is no longer found in the final drum.

Hydraulic pockets and/or cylinder bores can also be preforged in an embodiment. The gain in strength is also advantageous in these regions by the manufacture by means of forging and the material losses due to otherwise cutting working in of the bores and pockets are frequently substantial in the prior art.

A preforging of structural elements generally results in a material saving and in an avoidance of an extensive cutting machining of the round metals which can be solid steel bodies. The production steps for a possible further cutting treatment can be carried out at a blank that is lighter in comparison with the round metal, which can result in an additional energy saving and in less material wear.

Against the initially named background, the invention further relates to a drum for an axial piston machine that is manufactured by a method in accordance with the invention and to an axial piston machine having such a drum. The drum forged in accordance with the invention can be used in different kinds of axial piston machines. The axial piston machine can, for example, be one for converting mechanical energy into hydraulic energy or an axial piston motor for converting hydraulic energy into mechanical energy. The drum and the shaft are fixedly coupled to one another with respect to the rotation about their common axis of rotation. The plurality of cylinder bores extend in parallel with the axis of rotation of the drum and each receive a movably supported piston. The sliding disk is oblique to the axis of rotation of the drum and the pistons are connected to the sliding disk via articulated bearings. The axial piston machine in accordance with the invention is preferably a swash plate machine, wherein the drive shaft and the drum axis always extend in one line and the position of the plate differs therefrom. In an embodiment, it is an adjustable axial piston machine in which the angle of the sliding disk to the drum axis can be changed. The rotatably supported drum and the control plate fixed for the purpose of avoiding its rotation move relative to one another in operation of the axial piston machines, whereby the corresponding functional surfaces of the drum and of the control plate rub against each other.

BRIEF DESCRIPTION OF DRAWINGS

Further details and advantages of the invention result from the embodiments described in the following with reference to the Figures. There are shown in the Figures.

DESCRIPTION OF THE PREFERRED EMBODIMENTS

Figure 1:
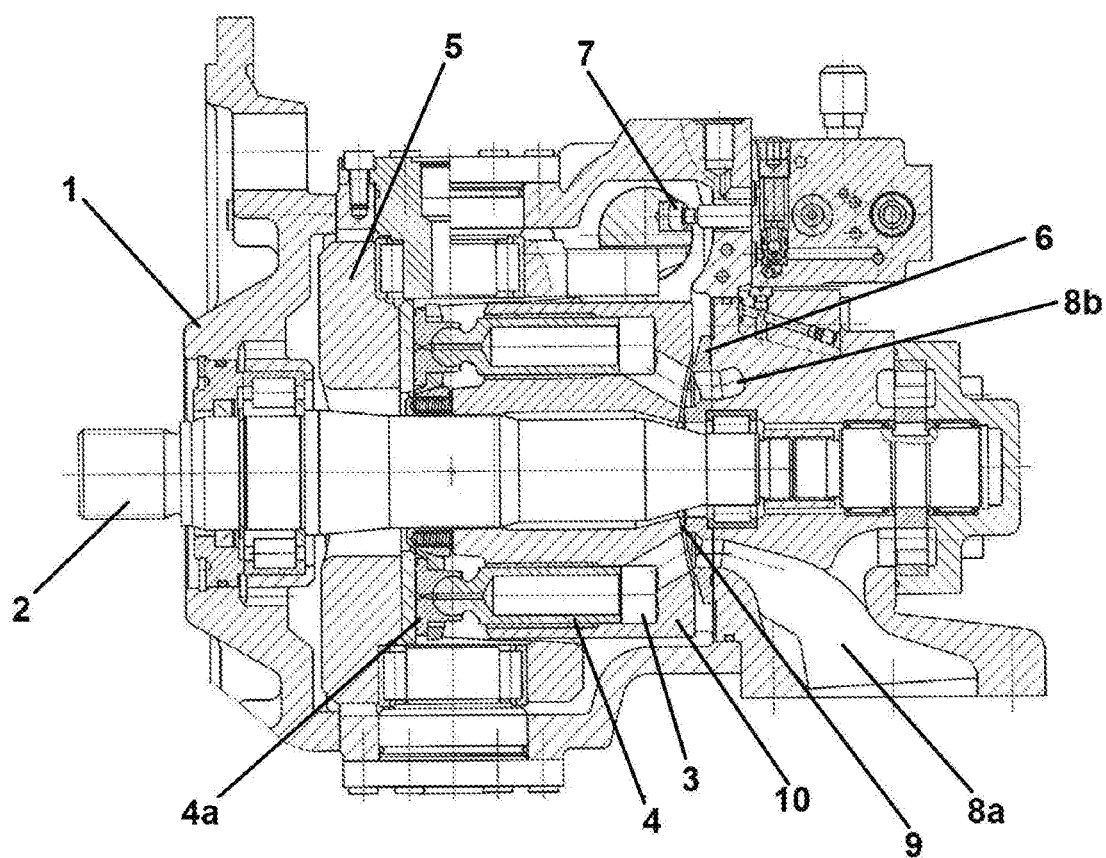
FIG. 1: a longitudinal section through an axial piston machine.

A longitudinal sectional view of an axial piston machine is shown in FIG. 1. The axial piston machine comprises a housing 1 having a bore for a shaft 2 that is rotationally fixedly connected to a drum 10 rotatably supported in the housing. The drum 10 comprises a plurality of axial cylinder bores 3 in which pistons 4 are received in a linearly displaceable manner. A sliding disk 5 and a control plate 6 are furthermore received in the housing 1 and the drum 10 is encompassed between them. The inclination of the sliding disk 5 relative to the drum 10 can be set using a control piston 7. Sliding blocks 4a whose lower sides contact the inner side of the sliding disk 5 are fastened to the ends of the pistons 4 at the sliding disk side. The hydraulic passages 8a for low pressure and 8b for high pressure of the axial piston machine open at the control plate 6. As can be seen from the Figure, the control plate 6 and the drum 10 contact one another in a contact region 9 and have touching functional surfaces. It can be recognized that the drum 10 has a depression-like recess at the corresponding front surface and the control plate 6 has a corresponding elevated portion.

Figure 2:
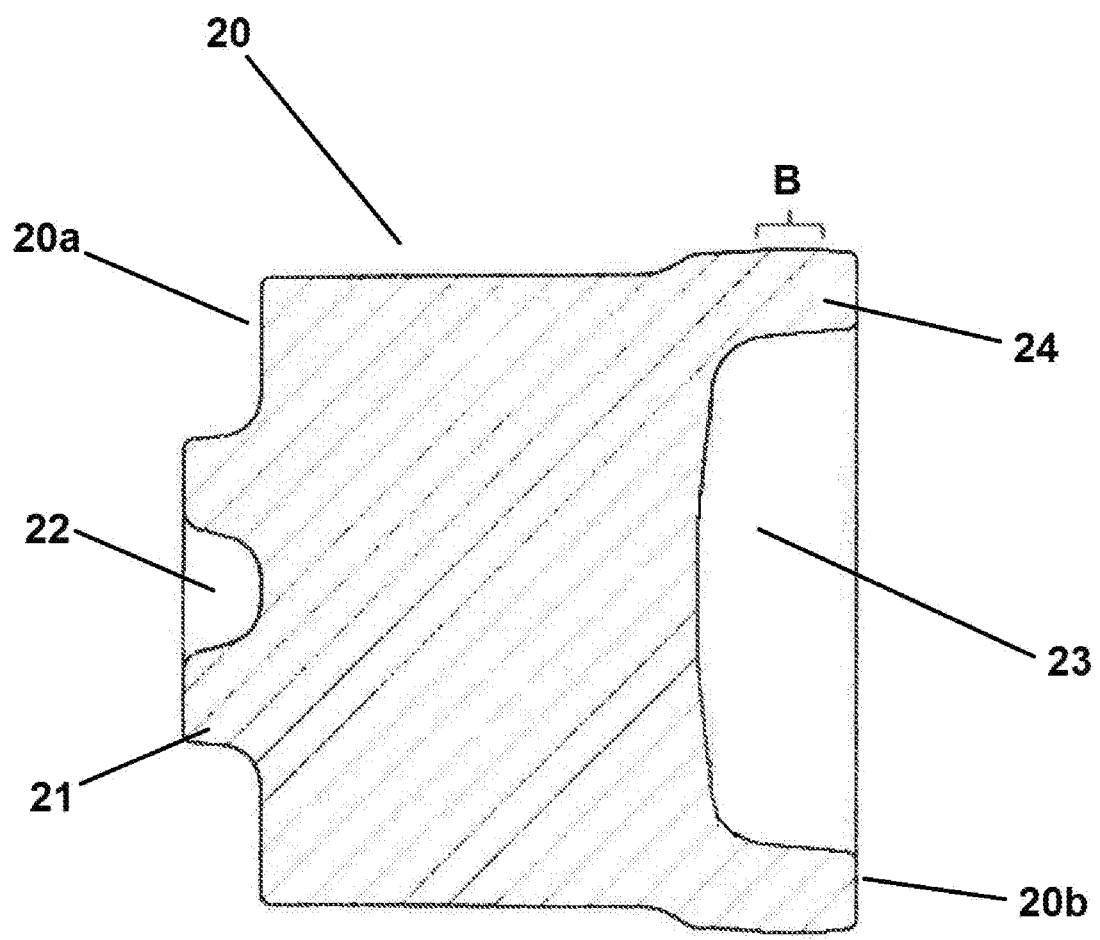
FIG. 2: a longitudinal section through a blank preforged from a round metal for a drum of an axial piston machine.

A longitudinal sectional view through a preforged blank 20 for a drum 10 of such an axial piston machine or also of another axial piston machine is shown in FIG. 2. The blank 20 comprises stainless steel and is manufactured in the form shown by drop forging of a perfectly cylindrical round metal at temperatures of lower than 150° C. In this respect, two die halves are used whose die division is in the range marked by reference symbol B in the Figure.

The preforged blank 20 has a forged neck region 21 that surrounds a likewise forged inlet region 22 of a center bore at an end face 20a and projects from the end face 20a in the axial direction. The end face 20a is that end face of the blank 20 that is disposed opposite the sliding disk 5 in the axial piston machine. A toothed arrangement for connection to the shaft can be preforged at the inner surface of the neck 21 or at the periphery of the inlet region 22 of the center bore. All these structural elements can be subjected to a particularly high torsional load in the operation of the axial piston machine so that the material solidification accompanying the cold forging is particularly advantageous at these structural elements. In addition, a tilt force acts on the neck region 21 in operation of the machine (clockwise in FIG. 1) that arises due to the pressure of the cylinder 4 (at the top in FIG. 1) of the high pressure side connected to the high pressure passage 8b, said pressure applied to the swash plate 5. There is beside a radial shear force that increases as the slanted position of the plate 5 increases and likewise acts on the neck region 21.

The blank furthermore has a forged spherical depression 23 at the other end face 20b that is disposed opposite the control plate in the axial piston machine. The spherical depression 23 is surrounded by a likewise forged casting margin 24, with the transition from the depression 23 to the casting margin 24 extending free of edges and at a constant tangent. The shape shown is particularly suitable for a coating of the front face 20b by direct casting to form a coated functional surface for interaction with the contact surface of a control plate (reference numeral 6 in FIG. 1).

The casting margin 24 is removed in a cutting process after casting the coating so that the region of the die division B, that represents a potential mechanical weak point, can no longer be found in the completed drum.

What is not shown in any more detail in the Figure, but is nevertheless possible, is the forging of an inner toothed arrangement in the inlet region 22 of the center bore, of an outer toothed arrangement in the jacket region of the blank 20, and pocket openings and cylinder bores for the pistons. Such an outer toothed arrangement in the jacket region of the blank 20 can serve as a target for a speed sensor.

The blank 20 shown can be further processed in the further course of the method by a direct casting of a coating in the depression 23 and by a cutting completion of the center bore and a cutting working of the cylinder bores in addition to associated pockets, etc. to ultimately obtain a complete drum 10 for an axial piston machine.

Figure 3:
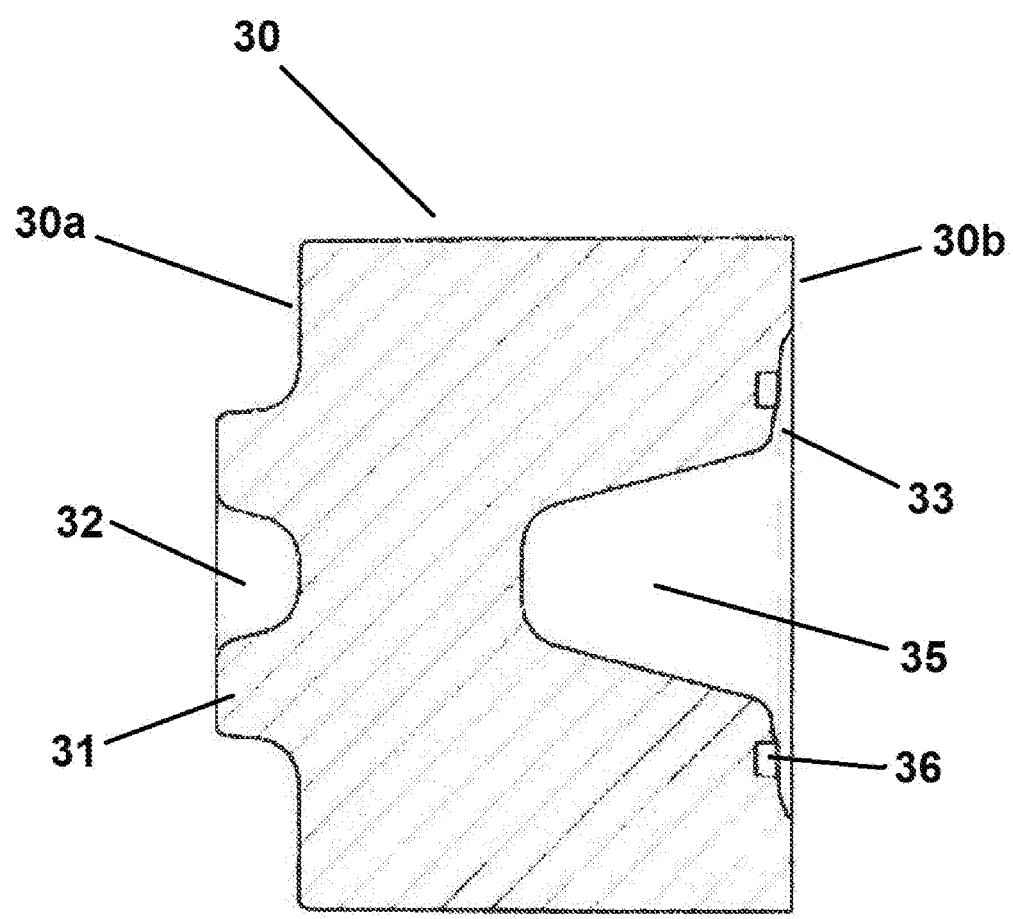
FIG. 3: a longitudinal section through a further variant of a blank preforged from a round metal for a drum of an axial piston machine.

FIG. 3 shows a further variant of a blank 30 forged from a round metal for a drum 10 of an axial piston machine. At its first front side 30a, the blank 30 of FIG. 3 is designed as identical to the blank 20 of FIG. 2 and accordingly has a forged neck region 31 that surrounds a likewise forged inlet region 32 of a center bore at a front face 20a and projects in an axial direction from the front face 30a. There are only differences at the second front face 30b. The depression 33 in the blank 30 of FIG. 3 that is optimized for a coating application by build-up welding is namely substantially flatter than in the blank 20 of FIG. 2 optimized for a coating application by direct casting and there is additionally no casting margin 24. However, an inlet region 35 of a center bore is also forged on the front face 30b, and indeed at the center of the depression 33. The inlet region 35 is comparatively deep and extends approximately over half the path between the front faces 30a and 30b so that a smaller distance has to be further drilled in a cutting manner in the blank 30 of FIG. 3 than in the blank 20 of FIG. 2. Pockets 36 that are subsequently connected in a cutting manner to cylinder bores are likewise already forged.

The invention claimed is:

1. A method of manufacturing a drum of an axial piston machine by machining a cylindrical blank, wherein
   the machining comprises forging;
   at least one structural element of the drum is produced or prefabricated by the forging; and
   the structural element is produced or prefabricated by said forging from a blank having a neck region concentrically projecting from a first end face of the drum in an axial direction and surrounding an inlet region of a center bore, and a spherical depression surrounded by a casting margin at a second opposite end face of the drum in the axial direction.

2. A method in accordance with claim 1, wherein the machining comprises manufacturing the blank from a round metal, and then further machining the blank in a cutting manner.

3. A method in accordance with claim 2, wherein the forging is a drop forging process.

4. A method in accordance with claim 3, wherein a die division is arranged in a region of the blank that is removed from the blank as part of the further cutting machining.

5. A method in accordance with claim 1, wherein the forging is a drop forging process.

6. A method in accordance with claim 5, wherein said step of drop forging comprises compressing said blank between two die halves having a die division at said casting margin surrounding said spherical depression at said second opposite end face.

7. A method in accordance with claim 6, comprising the step of drop forging a perfectly cylindrical round metal at a temperature lower than 150° C.

8. A method in accordance with claim 5, comprising the step of drop forging a perfectly cylindrical round metal at a temperature lower than 150° C.

9. A method in accordance with claim 1, wherein the forging is a cold forging process or a semi-hot forging process.

10. A method in accordance with claim 9, wherein temperature of a round metal is below 950° C.

11. A method in accordance with claim 1, wherein a structural element produced or prefabricated by forging is a section of the center bore.

12. A method in accordance with claim 1, wherein a structural element produced or prefabricated by forging is a toothed ring at the center bore or at the jacket surface.

13. A method in accordance with claim 1, wherein a structural element produced or prefabricated by forging is a hydraulic pocket or a cylinder bore.

* * * * *